April 16, 1935.  N. D. LEVIN  1,997,593
MATERIAL HANDLING MECHANISM
Original Filed April 30, 1930
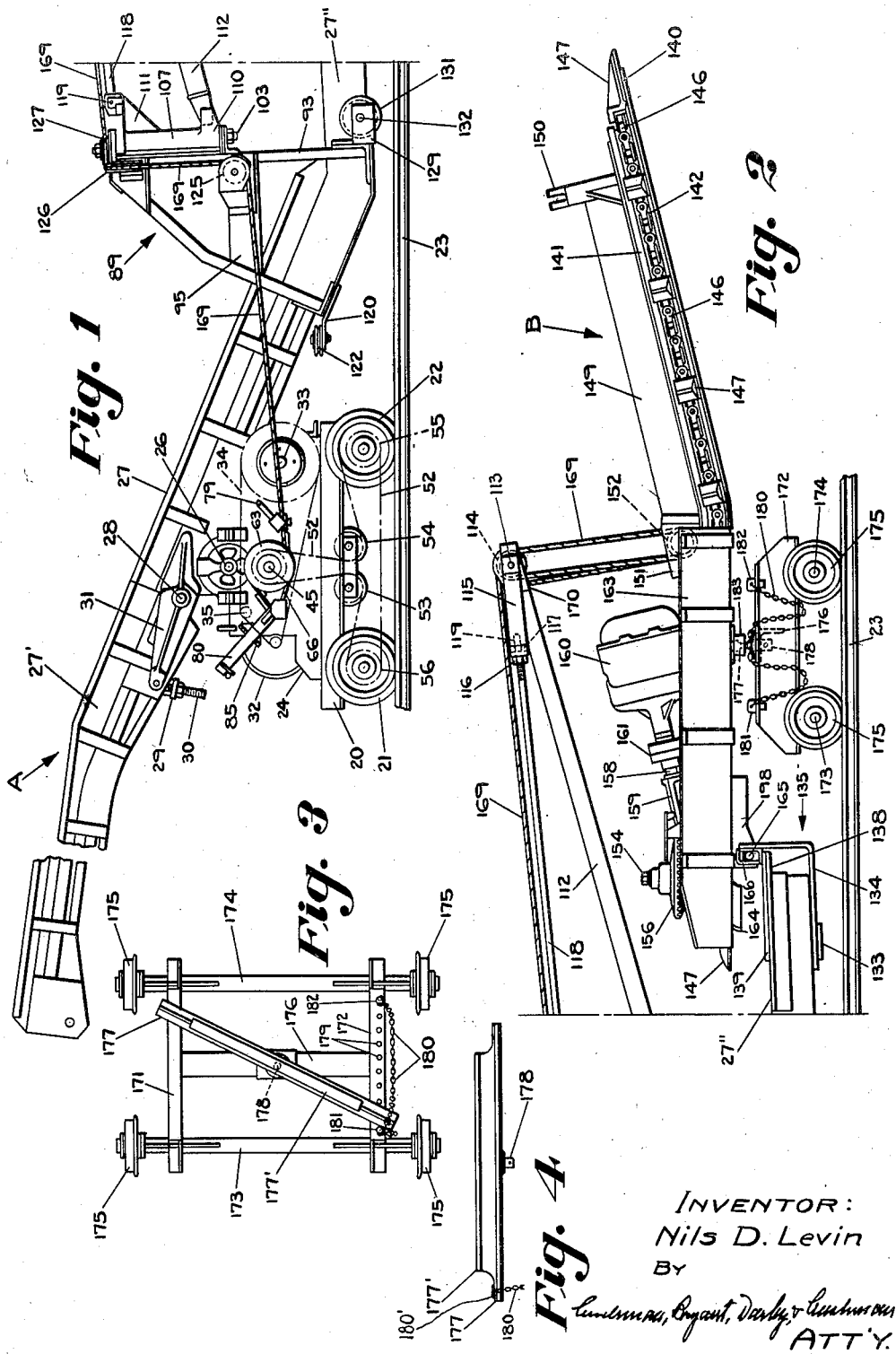
INVENTOR:
Nils D. Levin
BY
ATT'Y.

Patented Apr. 16, 1935

1,997,593

UNITED STATES PATENT OFFICE 1,997,593

MATERIAL HANDLING MECHANISM

Nils D. Levin, Columbus, Ohio, assignor to The Jeffrey Manufacturing Company, a corporation of Ohio Original application April 30, 1930, Serial No. 448,626. Divided and this application April 23, 1932, Serial No. 607,179. In Canada July 21, 1930

4 Claims. (Cl. 198—8)

The present invention relates to a loading machine, and particularly to a machine of this class adapted to be moved about a mine over the mine tracks and positioned thereon to load out material from the various workings.

The general characteristics of the machine according to the present invention are: A truck-mounted discharge conveyor having a receiving end adapted to be positioned in proximity to the mine track and a delivery end adapted to deliver at elevated points to the rear of the truck, the conveyor being swingable relative to the truck about both vertical and horizontal axes; a gathering conveyor having its delivery end pivoted to and above the receiving end of the discharge conveyor for swinging movement in vertical and horizontal planes relative to the latter and for tilting movement about its own longitudinal axis; a pony truck adapted to be positioned beneath and placed in temporary connection with the gathering conveyor when the machine is to be transported from place to place in the mine; a jib mounted on the receiving end of the discharge conveyor and extending above the gathering conveyor; hoisting tackle connecting the jib and the gathering conveyor; and power devices for operating the conveyors, for operating the hoisting devices, for swinging the gathering conveyor in horizontal planes relative to the discharge conveyor to engage it in material to be loaded out, and for propelling the conveyor supporting means over the mine tracks.

The object of the invention is the provision of an improved and efficient pony truck for combination with such loading apparatus.

Other objects of the invention will appear hereinafter, the novel features and combinations being set forth in the appended claims.

The present application is a division of my co-pending application, Ser. No. 448,626, filed April 30, 1930, for an improvement in Material handling mechanism.

In the accompanying drawing Figs. 1 and 2 are side elevations respectively of the rear and front ends of a loading machine of the type to which my improved pony truck is particularly adapted; and Fig. 3 is a plan view of the pony truck shown in elevation in Fig. 2; and Fig. 4 is an elevational view of the bolster.

The loading machine illustrated comprises generally a discharge conveyor A and a gathering conveyor B. The discharge conveyor A may be substantially the same (with some additions, as will hereinafter appear) as in the pit car loader described and claimed in my co-pending application, Ser. No. 386,647, filed August 17, 1929, in the United States Patent Office. Only a brief description of this discharge conveyor unit is deemed necessary.

As shown in Fig. 1, a truck frame 20 is provided with wheels 21, 22 adapted to travel on a mine track 23. Mounted on the truck frame 20 is a supporting frame 24 for pivotal movement about a vertical axis relatively to the truck frame 20.

The delivery end 27' of the discharge conveyor A is pivotally mounted on the frame 24 on the axis 28 and rests on a bolster 29 which is vertically adjustable on threaded rods 30 depending from the frame of the delivery end 27'.

An electric motor 32 mounted on the supporting frame 24 drives a counter-shaft 33 by means of the sprocket chain 34. An idler 35 engages the sprocket chain 34 to hold it clear of a winding drum 63 and its control appliances. A hoisting rope 169 is connected to and wound on the winding drum 63. Power transmission mechanism is connected between the shaft 33 and the winding drum 63 and is controlled by suitable clutch mechanism. By means of a lever 80 the brake 66 may be applied to the hoisting drum 63 and mechanism may be provided at 85 for holding the brake applied so that tension may continue on the rope 169 as hereinafter more fully explained.

On the shaft 45 is a driving sprocket for the truck propelling chain 52 which is guided around idler sprockets 53, 54 and truck propelling sprockets 55 and 56 on the axles of the wheels 21 and 22. By means of suitable clutch mechanism, power from the motor 32 through the shaft 45 may be applied to the truck propelling mechanism to transport the entire loading machine along the mine track 23.

The discharge conveyor A comprises a conveyor trough frame 27 pivoted at 26 to the supporting frame 24. The travelling conveyor mechanism on the trough frame 27 may be driven from the motor 32.

It will thus be seen that the conveyor A may be swung on a vertical axis relative to the truck frame 20 and also on the horizontal axis 26 relatively to the truck frame 20. The conveyor A may therefore be moved into position where its forward portion 27'' will be in horizontal position parallel to the mine track 23 and adjacent the same. In this position the rollers 131 may engage the rails of the mine track and assist in supporting the loading machine during operation. The rollers 131 are preferably flanged to co-act with the balls of the rails and brace the forward section 27" against lateral movement during operation of the gathering conveyor B. The supporting flanged rollers 131 may be mounted on horizontal pins 132 in supporting brackets 129.

At the forward end of the trough section 27" is pivoted at 133 a frame 135 having a lower plate 134 and an upper plate 139, both secured to the loop-shaped retainer 166 for the pivot rod 165 which extends through the block 198 secured to the under side of the frame of the gathering conveyor B. By means of the pivotal connection at 165 the gathering conveyor may be tilted upwardly or downwardly relatively to the discharge conveyor A. The gathering conveyor B may also be swung laterally relatively to the discharge conveyor on the vertical axis of the pivotal connection at 133 while delivery communication is maintained between the discharge end of the gathering conveyor and the receiving end of the conveyor A. By reason of the loop 166 which embraces the pivot rod 165 a limited tilting movement of the gathering conveyor B on the longitudinal axis of the latter may be secured during lateral swinging loading operation of the gathering conveyor while the flanged wheels 131 are on the mine track to prevent lateral movement of the section 27" of the discharge conveyor.

The gathering conveyor B comprises a bottom plate 140 bent upward at its rear end so as to be adapted to project above the receiving end of the discharge conveyor A. During operation the forward portion of the gathering conveyor rests in horizontal position on the ground in advance of the track 23.

Extending longitudinally of the plate 140 and secured thereto substantially centrally thereof are upper and lower chain guides 141 and 142 between which travels the chain 146 which is flexible in planes both parallel and perpendicular to the plate 140. At intervals flights 147 are secured to the chain 146 to project laterally of the plate 140 so as to propel material therealong and on one side or the other of the chain guiding means depending on the direction of travel of the chain. Extending longitudinally and centrally of the plate 140 is an upright baffle plate 149 at the forward end of which is located an upright post 150 having an upper bifurcated end. At the rear end of the plate 149 is a block 151 in which are mounted on a horizontal transverse axis a pair of sheaves 152.

At the rear end of the gathering conveyor B is journaled a shaft 154 in perpendicular relation to the base plate 140. This shaft at its lower end is connected to a sprocket which meshes with the conveyor chain 142 to drive the latter. To the upper end of the shaft 154 is secured a bevel gear 156 with which meshes a pinion on the rear end of the shaft 158 journaled in a bearing 159. A motor 160 is mounted on the upper central portion of the frame of the conveyor B with its armature shaft in alinement with the shaft 158 and in driving connection therewith through a coupling 161.

The inclined portion or delivery portion of the gathering conveyor B is provided with upwardly extending side or guard plates 163 to hold the coal or other material on the plate 140 as it travels up the incline, the rearward end of the plate 140 being cut away as indicated at 164 to permit the material to drop readily on to the receiving end of the discharge conveyor trough 27".

The motor 160 and the motor 32 are each reversible and each is provided with independently operable starting and controlling apparatus. The motor 160 is mounted on the gathering conveyor and moves bodily with the latter while the motor 32 is mounted on the supporting frame 24 and moves bodily with the latter when given a turntable movement relatively to the truck frame 20.

The hoisting rope or cable 169 which extends forwardly from the hoisting drum 63 is reaved about the sheave 125 which is mounted on the cross piece 95 of the frame 89. The rope or cable 169 then extends upwardly and is reaved about the direction sheaves 126 and 127 which are mounted on top of the struts 93 of the frame 89. Thence the rope 169 extends forwardly to and around the sheaves 114 and the sheaves 152 and is finally connected at 170 to the outer end of the boom 112. Inasmuch as a pair of sheaves is located at 152 there is another pair at 114, the latter being mounted on a pin 113 on the boom or crane jib 112. The rear end of the latter is seated in a socket 110 at the lower end of the casting 107 which is swiveled on an upright axis to brackets on the front side of the frame 89.

A U-shaped frame 115 has its forwardly extending arms journaled on the ends of the pin 113 so as to embrace the pair of sheaves 114 on the outer end of the jib crane 112. Secured to the frame 115 by means of adjustable nuts 116 and 117 is the threaded end of a tension rod 118 the rear end of which is pivoted at 119 to the bracket arm 111 at the upper end of the casting 107.

The jib 112 is thus supported for swinging movement about the axis defined by the pin 103 and may be vertically adjusted in the socket 110 by means of the nuts 116 and 117.

Upon operating the hoisting drum 63 to exert tension on the rope or cable 169 the gathering conveyor B may be swung upwardly about its trunnions 165 and in its raised or lowered position the gathering conveyor may be swung laterally about its vertical pivot 133, while delivery communication is always maintained between the rear end of the gathering conveyor and the forward receiving end 27" of the discharge conveyor. It should be understood, however, that during operation of the gathering conveyor the flanged wheels 131 should be in engagement with the rails 23 so as to brace the receiving end 27" of the discharge conveyor against lateral movement relatively to the track 23. Furthermore, during operation of the gathering conveyor the forward portion of the plate 140 rests on the floor or ground in advance of the track 23 in horizontal position. To secure a gathering operation of the conveyor B the rope or cable 169 is disconnected entirely from the sheaves 152, 114, 127, 126, and 125 and is extended around a portable sheave connected to a fixed anchorage with the free end of the rope or cable connected to the upper bifurcated end of the upright post 150. Now upon operating the winding drum 63 to exert a pull or draught on the rope 169 the gathering conveyor may be swung laterally on the pivot 133 while a limited tilting movement on the longitudinal axis of the gathering conveyor is permitted by reason of the loose connections at the trunnions 165 shown in Fig. 2. Such tilting movement will enable the advancing edge of the plate 140 to exert a more efficient scraping action on the surface from which the material is being gathered.

When the fixed anchorage is located on that side of the machine opposite to the hoisting drum 63 the rope 169 may be passed around the sheave 122 mounted on the bracket 120, so as to guide the rope transversely of the machine to the anchorage. By means of this arrangement the gathering conveyor may be swung in the opposite direction or anti-clockwise when viewed in plan.

For transporting the loading machine from place to place I have provided the pony truck shown in Figs. 2 and 3. This truck comprises the longitudinal frame members 171 and 172 mounted on axles 173 and 174 on the ends of which are journaled the flanged wheels 175. On a cross member 176 of the truck frame is centrally pivoted a bolster 177 on a vertical pin 178. This bolster is shown in plan in Fig. 3 and in elevation in Fig. 4.

The longitudinal side frame member 172 is provided with a series of perforations at 179 in which are adapted to fit stop or abutment pins 181 and 182 connected by a chain 180 for the convenience of handling and intermediate its ends this chain may be welded at 180' to the bolster to prevent loss. Inasmuch as the bolster 177 is movable on the vertical axis of the pin 178 in a plane immediately above the top of the frame member 172 the pins 181 and 182 will act as abutments to limit the angular movement of the bolster 177. When the stop pins 181 and 182 are placed in the end holes 179 as shown in Figs. 2 and 3 the bolster will have its maximum angular limited swinging movement but when the stop pins are located closer to the transverse frame member 176 the limited angular swinging movement will be less.

The gathering conveyor B at a point to the rear of its center of gravity and preferably directly beneath the electric motor 160, as shown in Fig. 2, is provided with a transverse inverted cup-like member 183 which is adapted to fit over a registering raised portion 177' of the bolster 177, so that when the pony truck is in the position shown in Fig. 2 relative swinging of the conveyor B will force swinging of the bolster 177 on the pivot at 178, such swinging being limited by the stop pins 181 and 182 if inserted in two of the holes 179. Inasmuch as the member 183 is cup-shaped it affords an elongated socket having end walls or abutments fitting over the ends of the registering raised portion 177' on the bolster 177. Consequently when the gathering conveyor is mounted on the pony truck displacement therefrom laterally will be prevented. That is to say, the pivotal connection between the inverted cup-shaped member 183 and the bottom of the gathering conveyor B co-acts with the ends of the elongated socket 183 and the ends of the raised portion 177' and the pivotal connection at 178 to prevent lateral movement of the gathering conveyor relatively to the pony truck.

After the material in advance of the track 23 has been gathered and loaded the rope or cable 169 is re-connected to the jib frame 112 and the hoisting drum 163 operated to lift the gathering conveyor sufficiently to permit movement of the pony truck under the same. When the inverted cup-shaped member 183 is let down onto the elongated support 177' to fit over the latter the forward portion of the gathering conveyor in advance of the pivot 178 will over-balance the rear portion of the gathering conveyor sufficiently to effect lifting of the receiving section 27" of the discharge conveyor up off the track to the position shown in the drawing. In other words, the over-balancing effect will cause the trunnion connections at 165 to lift the flanged wheels 131 off the track 23 so that during transportation of the entire loading machine to another place the discharge conveyor A will be free to swing on its vertical axis relative to the truck 20 and the gathering conveyor will be free to swing on the vertical axis 178 relatively to the pony truck while the brake 66 holds the hoisting drum 63 stationary and the hoisting rope or cable 169 supports the gathering conveyor in position where it will have ample clearance from the upper side of the pony truck. When the loading machine is then transported around curved portions of the track 23 the discharge conveyor may swing on its vertical axis relative to the truck 20, the gathering conveyor may swing on its vertical axis 178 relatively to the pony truck and the jib frame may swing relatively to the frame 89 on the vertical axis 103. The limiting stop pins 181 and 182 will limit the angular movement of the gathering conveyor relative to the pony truck thereby compelling the discharge conveyor A to take its share of the desirable swing on its upright axis relative to the truck 20.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In a loading machine, the combination with a main self-propelling truck, of a supplemental truck spaced from said main truck, a sectional conveyor comprising front and rear sections, means for mounting the rear section of said conveyor on said main truck for free swinging movements relatively thereto on an upright axis, means for mounting the front section on said supplemental truck for free swinging movements relatively thereto on an upright axis, a free pivotal connection between said sections and intermediate the trucks for relative swinging movements between the latter on an upright axis, and means for limiting the swinging movement of the section on the supplemental truck, whereby to limit buckling of the sections about their pivotal connection during forward propulsion by said main truck.

2. In a machine of the class described, the combination with a main self-propelling truck, of a supplemental truck spaced from the main truck, a bolster freely pivoted to said supplemental truck on an upright axis, means limiting the swinging range of said bolster relative to said supplemental truck, a horizontally extending sectional conveyor comprising front and rear sections freely pivotally connected on an upright axis between the trucks, means supporting the rear section of said conveyor on said main truck for free swinging movements relative thereto on an upright axis, positive thrust transmitting means for supporting and positioning the front section on said bolster and engaging the latter to enforce its participation in swinging movements of the section supported thereby, buckling of said sections about their pivotal connection being limited by said limiting means during forward propulsion by said main truck.

3. In a machine of the class described, the combination with a main self-propelling truck, of a supplemental truck spaced from the main truck, a bolster freely pivoted to said supplemental truck on an upright axis, means limiting the swinging range of said bolster relative to said supplemental truck, a horizontally extending sectional conveyor comprising front and rear sections freely pivotally connected on an upright axis between the trucks, means supporting the rear section of said conveyor on said main truck for free swinging movements relative thereto on an upright axis, positive thrust transmitting means for supporting and positioning the front section on said bolster and engaging the latter to enforce its participation in swinging movements of the section supported thereby, said last-named means providing for pivotal movement between the bolster and supported section on an axis extending transversely of the latter, buckling of said sections about their pivotal connection being limited by said limiting means during forward propulson by said main truck.

4. In a machine of the class described, the combination with a main self-propelling truck, of a supplemental truck spaced from the main truck, a bolster freely pivoted to said supplemental truck on an upright axis, means limiting the swinging range of said bolster relative to said supplemental truck, a horizontally extending sectional conveyor comprising front and rear sections freely pivotally connected on an upright axis, means supporting the rear section of said conveyor on said main truck for free swinging movements relative thereto on an upright axis, positive thrust transmitting means for supporting and positioning the front section on said bolster and engaging the latter to enforce its participation in swinging movements of the section supported thereby, said last-named means comprising a rib extending longitudinally of the bolster and an inverted cup-like member secured to the underside of said last-named section in transverse relation thereto and receiving said rib, buckling of said sections about their pivotal connection being limited by said limiting means during forward propulsion by said main truck.

NILS D. LEVIN.